Oct. 2, 1928.  
F. W. MANNING  
1,686,096  
CONTINUOUS EXPELLING AND CLARIFYING PROCESS AND APPARATUS  
Filed March 6, 1928

INVENTOR.  
FRED W. MANNING.  
BY  
Townsend, Loftus & Abbett  
ATTORNEYS.

Patented Oct. 2, 1928.

1,686,096

UNITED STATES PATENT OFFICE.

FRED W. MANNING, OF BERKELEY, CALIFORNIA.

CONTINUOUS EXPELLING AND CLARIFYING PROCESS AND APPARATUS.

Application filed March 6, 1928. Serial No. 259,583.

This application is a continuation in part of my copending applications entitled Continuous expelling and clarifying process and apparatus, Ser. No. 751,058, filed November 20, 1924, and, Apparatus for continuous expelling and clarifying fruit juices, Ser. No. 257,875, filed February 29, 1928.

The present invention relates to an improved process and apparatus for the expressing of liquids from solids followed by the immediate clarifying or purifying of the expressed liquid.

In the prior applications referred to I have disclosed a process and an apparatus applicable to the extraction of juices from fruits and vegetables and which contemplated the continuous expelling of liquids from solids containing them and simultaneously treating the expelled liquids. This was accomplished by disintegrating the solids and thereafter passing the reduced solids with contained or expressed liquid into a compression chamber. In this chamber the liquid is almost completely expelled from the pulp solids and is forced through a wall of either stationary or moving treating solids into a filtrate receiver. The forcing of the expressed liquid through the wall of treating solids is accomplished by a differential in liquid pressure between the pulp and filtrate sides of the wall, which may be accomplished by providing sub-atmospheric pressure on the filtrate side or mechanical pressure on the pulp side or both.

By the use of the process and apparatus disclosed in these prior applications fruit can be converted inexpensively into perfectly pure and brilliantly clear juices free from insoluble solids, colloidal suspensions, etc., for beverages, jellies, syrups and the like.

The extraction of juices from fruit solids and their clarification in the presence of air permit the destruction of vitamin "C" and especially will the destruction be rapid if the expelling and clarification is carried out at high temperatures. Therefore, it is the principal object of this present invention to avoid this detrimental effect to the antiscorbutic value of the fruit juices by reducing the pulp of the fruit and treating the juices expelled in the absence of oxygen and maintaining the juices out of contact with air from the time the fruit solids are disintegrated until the juices are drawn off for use. In carrying out this object in practice I reduce the juice containing solids, expel the juices therefrom and treat the juices in the absence of oxygen. The treating of the juices includes clarification and purification by passing the expelled juices through either a stationary or moving wall of treating material into a filtrate receiver. The liquids are passed through this wall of treating solids by means of a differential in liquid pressure between the pulp from which the liquid is expressed and the filtrate sides of the wall.

One form which the invention may assume is exemplified in the following description and illustrated by way of example in the accompanying drawings, in which.

Figure 1:
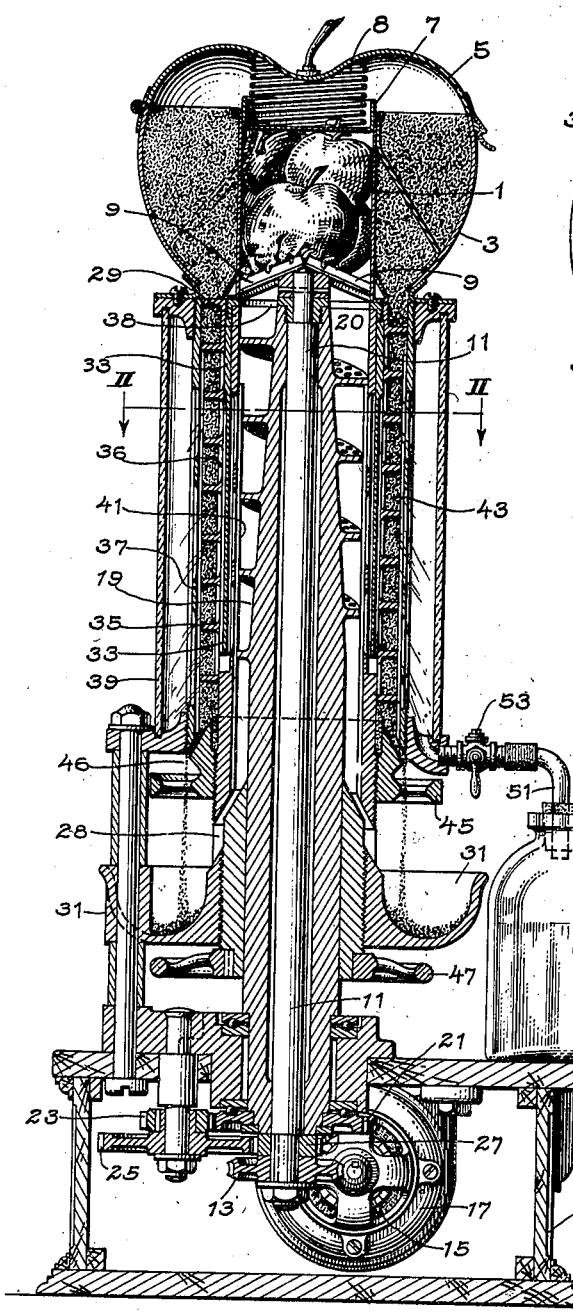
Fig. 1 is a sectional elevation of the apparatus.
Figure 2:
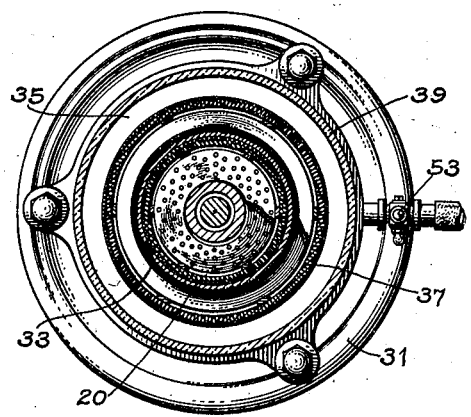
Fig. 2 is a horizontal sectional view taken on line II—II of Fig. 1.
Figure 3:
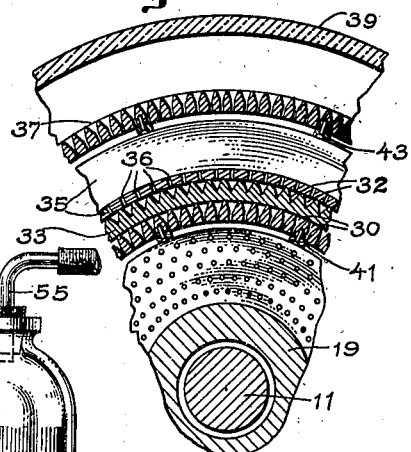
Fig. 3 is a fragmentary enlarged view of Fig. 2.
Figure 4:
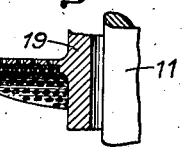
Fig. 4 is a fragmentary enlarged elevation in vertical section through the compression screw.

Referring more particularly to the accompanying drawings, I disclose an apparatus capable of practicing the process which comprises a cylinder 1 to receive the pulp solids to be reduced. Surrounding this cylinder 1 is a hopper 3 to receive the treating solids utilized in the clarification and purification of the juices expressed from the solids. The upper end of the hopper 3 is enclosed by an air tight hinged door 5.

Reciprocably mounted in the cylinder 1 is a liquid-tight piston 7 interposed between which and the door 5 is an expansion spring 8 adapted to advance the piston in the cylinder 1 to force the pulp solids against the graters or crushers 9 which operate to reduce the solids. These graters or crushers 9 are driven by a motor 17 through the medium of a shaft 11 which is connected to the motor by a worm gear 13 and a worm 16. Arranged below the crushers and concentrically of the shaft 11 is a compression screw 19, the flights of which are perforated and covered with a coarse filtering fabric protected by a perforated wearing plate. This compression screw 19 is revolved by the motor 17 through gears 21, 23, 25 and 27 and the shaft 11. The motor 17 and all of the gears are enclosed within a cabinet 18 which also forms a support or standard for the apparatus.

Surrounding the compression screw is an inner filter wall 29, the lower end of which is shaped to form a trough 31. Arranged over this wall 29 and fixed permanently to it is a grooved imperforate drainage sleeve 23 around which rotates a perforated feeding screw cylinder 35. This latter operates inside of an outer filter wall 37 which is surrounded by a glass cylinder 39.

The filter walls as shown are made from slotted pipes or tubes but they may be otherwise constructed as from suitable spaced, parallel bars, cylinders lined with filter fabric, etc.

Distance bars 41 and 43 are attached to the filter walls to prevent of the turning of the solids with the screws and disturbance of the solids next the filtering slots. The width of the filter slots in the inner and outer filter walls will usually vary between 5/1000" and 10/1000" but the width of the slots 36 in the feeding screw cylinder should be greater so that any solid matter passing through the inner filtering wall will readily pass into and be retained by the treating solids. Adjusting nuts 45 and 47 regulate the compactness of the treating and pulp solids respectively by regulating the size of the discharge openings 46 and 28. The glass filtrate receiver jar 49 is connected to the glass cylinder 39 by means of a connection 51 and three way cock 53, and connected to a water jet vacuum pump, not shown, by means of a connection 55.

The operation of the apparatus thus constructed has been in part indicated in connection with the foregoing description. The fruit or other solids are introduced into the cylinder 1 intermediate the piston 7 and the graters or crushers 9. The vacuum created in the filtrate receiver jar 49 exhausts the air from the cylinder 1 and from the remainder of the apparatus, so that the fruit will be reduced in the absence of oxygen and likewise the liquid will be expressed therefrom and treated in the absence of oxygen. The fruit or other solids after being reduced or shredded pass into the compression chamber 20 wherein the compression screw 19 is disposed. In this chamber the pressure exerted readily separates the juice from the pulp.

The liquid expressed from the pulp will be caused to pass through the slots and down the outside grooves 30 of the inner filter wall and up the grooves 32 of the drainage sleeve 33 through the slots 36 of the feeding screw cylinder into and through the treating solids where it is clarified, decolorized or otherwise purified, and finally on passing through the slots of the outer filter wall 37 the liquid runs down through the filtrate receiver 49 brilliantly clear. As will be apparent, the disintegrating of the solids, the expressing of the liquid therefrom and the purifying thereof are all carried on simultaneously and in a substantially continuous manner.

The feeding screw cylinder 35 is attached to and rotates with the compression screw 19, by means of a spider nut 38 although, if desirable, means may be supplied to rotate the screws independently of each other. The pitch of the flights of both screws is determined by the purpose for which the apparatus is used, the pulp solids being forced down and discharged through the opening at 28 in the lower end of the filter wall 29 into the hopper 31 as quickly as the filtrate can be forced through the treating solids, and the treating solids moved along and discharged through the opening at 46 into the same hopper through the openings in the wheel of the adjusting nut 45, before any clogging takes place. The flights of both screws are kept from direct contact with their respective filtering walls by means of distance bars 41 and 43 so that the solids may be constrained to move forwardly axially without disturbance to the solids next the filtering slots. However, in many cases these distance bars will not be necessary.

The advancing or underside of the flights of the compression screw being perforated and covered with a filter fabric protected by a thin perforated wearing plate, serves the purpose of constantly clarifying the rising liquid with the downward movement of the solids before the liquid comes in contact with the filter wall and thereby increases the filtering rate.

The apparatus herein disclosed may be constructed of any suitable metal or material capable of withstanding the action of the juice acids.

From the foregoing it is obvious that by my present invention I am enabled to express the juices expeditiously from fruit and the like, and to clarify and purify such juices. Likewise, the reducing of the fruit and the subsequent steps in expressing and clarifying the juices are carried out in the absence of oxygen to avoid any detrimental effect to the antiscorbutic value of the juices. It is also apparent that the juices may be maintained out of contact with oxygen from the time that the fruit is introduced into the apparatus until they are drawn off of the receiver 49 for use.

It is to be understood that various modifications may be made in my invention without departing from the spirit of the invention as defined in the appended claims.

Having thus described my invention, what I claim and desire to secure by Letters Patent is:

1. A process of the character described comprising disintegrating fruit or vegetables and removing the juices from the disintegrated solids in the absence of air.

2. A process of the character described comprising disintegrating fruit or vegetables, removing the juices from the disintegrated solids, and treating the juices all in the absence of oxygen.

3. A process of the character described comprising disintegrating juices containing solids, removing the juices from the disintegrated solids, treating the juices to clarify and purify the same, and storing the juices all in the absence of air.

4. A process of the character described consisting of disintegrating fruit or vegetables in the absence of air, removing the juices from the disintegrated solids in the absence of air, passing the juices through a body of treating solids moving over a filter wall, and storing the juices in the absence of air.

5. An expressing and treating process consisting of disintegrating liquid-containing solids in the absence of air, expressing the liquid from the disintegrated solids, and simultaneously passing the expressed liquid through a body of treating solids in the absence of air.

6. A continuous fruit expressing and treating process consisting of continuously disintegrating fruit or vegetables in the absence of air, continuously expressing the juices from the disintegrated solids in the absence of air, passing the expressed juices through a body of treating solids moving over a filter wall, and storing the expressed and treated juices in the absence of air.

7. An expressing and treating process consisting of disintegrating liquid containing solids, expressing the liquid from the disintegrated solids, and simultaneously passing the expressed liquid through a body of treating solids in the absence of air.

FRED W. MANNING.